US012602021B2

(12) United States Patent
Borup et al.

(10) Patent No.: US 12,602,021 B2
(45) Date of Patent: Apr. 14, 2026

(54) HYDROGEN SUPERVISORY CONTROL AND DATA ACQUISITION SYSTEM

(71) Applicant: Everfuel Europe A/S, Herning (DK)

(72) Inventors: Uffe Vikøren Borup, Sydals (DK); Jacob Bech Krogsgaard, Holstebro (DK)

(73) Assignee: EVERFUEL EUROPE A/S, Herning (DK)

(*) Notice: Subject to any disclaimer, the term of this patent is extended or adjusted under 35 U.S.C. 154(b) by 484 days.

(21) Appl. No.: 18/012,406

(22) PCT Filed: Jun. 28, 2021

(86) PCT No.: PCT/DK2021/050213
§ 371 (c)(1),
(2) Date: Dec. 22, 2022

(87) PCT Pub. No.: WO2022/002331
PCT Pub. Date: Jan. 6, 2022

(65) Prior Publication Data
US 2023/0259088 A1      Aug. 17, 2023

(30) Foreign Application Priority Data

Jun. 30, 2020    (DK) ............................ PA 2020 70433

(51) Int. Cl.
*G06Q 10/06* (2023.01)
*G05B 19/042* (2006.01)

(52) U.S. Cl.
CPC ........... *G05B 19/042* (2013.01); *G06Q 10/06* (2013.01); *G05B 2219/24215* (2013.01)

(58) Field of Classification Search
CPC ........ G05B 19/042; G05B 2219/24215; G06Q 10/06
See application file for complete search history.

(56) References Cited

U.S. PATENT DOCUMENTS

2006/0293862 A1*  12/2006  Copeman .................. C01B 3/00
                                                        702/24
2007/0259220 A1*  11/2007  Redmond ............. C01B 3/0021
                                                        429/444
(Continued)

FOREIGN PATENT DOCUMENTS

JP        2017-9069 A    *   1/2017
WO        2016064626 A1      4/2016
(Continued)

OTHER PUBLICATIONS

Abad et al. (Anthony Velazquez Abad, Paul E. Dodds, Green hydrogen characterisation initiatives: Definitions, standards, guarantees of origin, and challenges, Feb. 6, 2020, Elsevier Ltd., Energy Policy 138 (2020) 111300) (Year: 2020).*
(Continued)

*Primary Examiner* — Michael W Choi
(74) *Attorney, Agent, or Firm* — CANTOR COLBURN LLP

(57) ABSTRACT
The invention relates to a hydrogen supervisory control and data acquisition system for monitoring a plurality of batches of hydrogen, the hydrogen supervisory control and data acquisition system comprising: a hydrogen production facility client, associated with a hydrogen production facility, a hydrogen customer client, associated with an entity receiving at least a subset of the plurality of batches of hydrogen and a central computer system. The central computer system is configured to establish a lifecycle data package of the plurality of batches of hydrogen. The lifecycle data package includes information associated with the production of the plurality of batches of hydrogen. The central computer system is configured to provide at least part of the lifecycle data package, to said hydrogen customer client.

20 Claims, 2 Drawing Sheets

(56)  References Cited

U.S. PATENT DOCUMENTS

Figure 1:
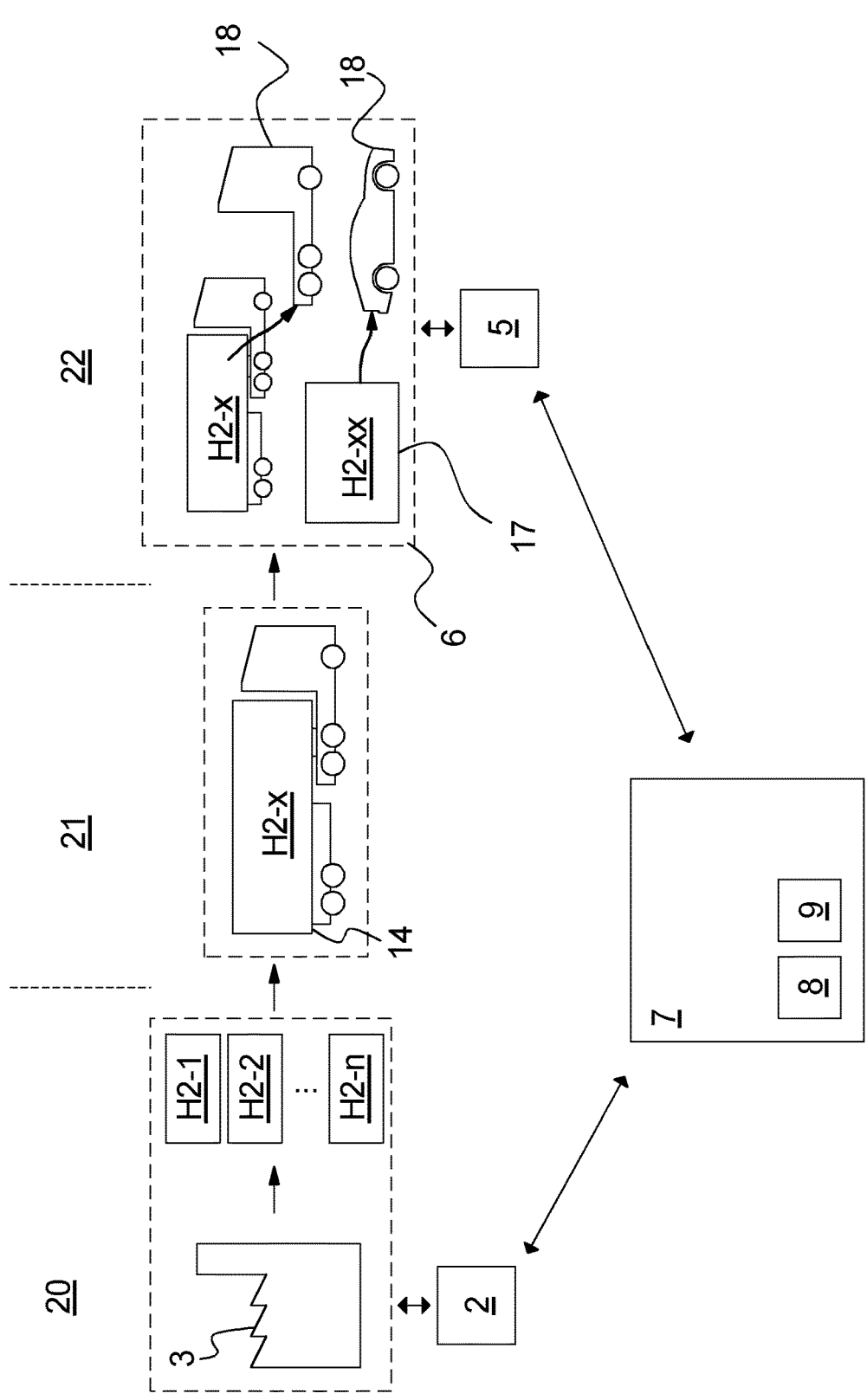

| 2009/0043415 | A1  | 2/2009  | Sun |
| 2009/0177505 | A1* | 7/2009  | Dietrich ................. G06Q 10/08 705/7.37 |
| 2010/0258449 | A1* | 10/2010 | Fielder ................. F03B 17/061 204/278 |
| 2011/0009984 | A1* | 1/2011  | Mukhi ............... G05B 23/0232 700/83 |
| 2011/0053016 | A1* | 3/2011  | Braithwaite ...... H01M 8/04388 429/427 |
| 2013/0225885 | A1  | 8/2013  | Foody |
| 2020/0156925 | A1  | 5/2020  | Hasegawa |
| 2021/0222832 | A1* | 7/2021  | Allidieres ............ F17C 13/026 |
| 2022/0292582 | A1* | 9/2022  | Naito ................ G06Q 30/0635 |

FOREIGN PATENT DOCUMENTS

| WO | WO-2017022135 | A1 * | 2/2017  | ............... C01B 3/00 |
| WO | WO-2018083781 | A1 * | 5/2018  | ............ G06Q 10/06 |
| WO | 2019189501    | A1   | 10/2019 | |

OTHER PUBLICATIONS

International Search Report for corresponding application PCT/DK2021/050213 filed Jun. 28, 2021; Mail date Nov. 11, 2021.

Taibi Emanuele, et al., "Hydrogen From Renewable Power". Technology Outlook for the Energy Transition, Sep. 30, 2018, XP55844200.

Written Opinion for corresponding application PCT/DK2021/050213 filed Jun. 28, 2021; Mail date Nov. 11, 2021.

* cited by examiner

HYDROGEN SUPERVISORY CONTROL AND DATA ACQUISITION SYSTEM

FIELD OF THE INVENTION

The present invention relates to a hydrogen supervisory control and data acquisition system, for facilitating information relating to production and distribution of hydrogen.

BACKGROUND OF THE INVENTION

Utilization of fuel cell vehicles using hydrogen as fuel may be a crucial element in meeting the future demands of sustainable transportation, which aims to minimize the environmental impact compared to transportation based on fossil fuels. Fuel cell technology is particularly crucial for larger vehicles, where conventional batteries cannot provide the necessary energy density.

However, hydrogen as fuel can both be produced using renewable energy, and fossil fuels, and for the customer, there is no straightforward method for obtaining information relating to the production of hydrogen to be purchased.

Further, producing and distributing hydrogen is a complex task, and it is challenging to balance the production and distribution with the interchangeable power generation provided by renewable energy sources.

SUMMARY OF THE INVENTION

The inventors have identified the above-mentioned problems and challenges related to production and distribution of hydrogen, and subsequently made the below-described invention which may increase optimize hydrogen production and distribution to minimize the associated environmental footprint.

An aspect of the invention relates to a hydrogen supervisory control and data acquisition system for monitoring a plurality of batches of hydrogen, the hydrogen supervisory control and data acquisition system comprising:

a hydrogen production facility client, associated with a hydrogen production facility and configured for acquiring information related to the production of the plurality of batches of hydrogen at the hydrogen production facility, and a central computer system comprising a data processor and a data storage, the central computer system is configured for communicating with the hydrogen production facility client, wherein the central computer system is configured to, based on information received from the hydrogen production facility client, establish a lifecycle data package of at least a part of the plurality of batches of hydrogen, wherein the lifecycle data package includes information associated with the production of the part of the plurality of batches of hydrogen.

According to an embodiment of the invention, the system furthermore comprising a hydrogen customer client, associated with an entity receiving at least a subset of the part of the plurality of batches of hydrogen, and the central computer system is configured to communicate at least part of the lifecycle data package, to said hydrogen customer client.

In the context of the present invention, the lifecycle data package should be understood as including information associated with a given batch of produced hydrogen. Establishing a lifecycle data package of a batch of produced hydrogen is advantageous in that it has the effect, that it may add value to the batch of produced hydrogen which increases the marked value thereof, adds traceability of the batch and it facilitate faster and more precise root cause analysis.

Further, establishing a lifecycle data package of a batch of produced hydrogen is advantageous in that it has the effect, that a particular batch of produce hydrogen can be followed and tracked. This has the effect that, in case the hydrogen is not complying with quality standards, tracking the hydrogen all the way back to a particular production facility may help find the source of why the quality is not optimal. Tracking should here also be understood as linking a batch of produced hydrogen to a particular source of electric energy that has been used to produce it. In this way, it is possible for an interested party to document the origin of energy used to produce the hydrogen the interested party is using or selling.

A hydrogen supervisory system for monitoring (and to some extent also controlling) a plurality of batches of hydrogen further allows a detailed overview of the supply chain of hydrogen for fuel cell vehicles and other hydrogen customers, which enables easier management and optimization of this supply chain, which is advantageous.

In the context of the present invention, hydrogen supervisory control and data acquisition system (sometimes referred to simply as supervisory system) should be understood as a system comprising a central computer configured for monitoring and communicating with system clients and/or external databases. This includes receiving information of and from the facilities associated with the system clients and provide control parameters to these facilities, which can be used e.g. to start or adjust production of hydrogen, select a particular tube trailer over another, facilitate payment of hydrogen used as fuel, etc. The control parameter may in this context be categorized as control parameters based on which a facility may start or stop production of hydrogen, postpone production to a determined point in time or book a particular tube trailer swap at a determined point in time.

Hence, the hydrogen supervisory control and data acquisition system should be understood as a superior monitoring and control system. Thus, not a comprehensive control system of a particular facility/element, but rather supervisory software and hardware superior to such comprehensive control system. Examples of such comprehensive control is PLCs (PLC; Programmable Logic Controller) and other devices controlling e.g. facilities/elements such as a renewable power generator, hydrogen production facility, hydrogen tube trailer, hydrogen refueling station, fuel cell vehicle, etc. On top of this comprehensive control system, the hydrogen supervisory control and data acquisition system is located as a second level control and monitoring system such as a SCADA system of an industrial process/control.

In the context of the present invention, the hydrogen production facility should be understood as the facility at which hydrogen is produced and temporary stored until it is loaded in the hydrogen tube trailer if not directly loaded into a hydrogen distribution piping system or a tube trailer. Accordingly, the hydrogen production facility client comprises at least hardware and software required to establish a data communication interface between the central computer system and the hydrogen production facility.

In the context of the present invention, the hydrogen customer client should be understood as an application running on a portable device controllable by a person associated with a fuel cell vehicle, hydrogen refueling station, production apparatus using hydrogen in the production, etc. via which the user gets access to information of the lifecycle data package.

In the context of the present invention, the central computer system should be understood as a computer system accessible via the internet and configured for receiving, processing and storing data related to the production and usage of hydrogen. This includes establishing lifecycle information of a batch of produced hydrogen which is provided to the costumer or user of the hydrogen. Lifecycle information should be understood as part of or information included in the lifecycle data package.

In the context of the present invention, a batch of produced hydrogen is used to address a quantity of hydrogen that is produced under substantially the same conditions. Typically, a batch of hydrogen is produced within a specific time period, based on the same power supply (to the electrolyser), energy amount used to produce, based on an amount of energy e.g. defined by what is produced by a renewable power generator and used by hydrogen production facility, a particular energy mix of the utility grid within a given period of time, delivered to a MEGC trailer, etc.

It should be noted, that in this description of the present invention focus is on the green hydrogen i.e. hydrogen produced based on energy from a renewable energy source. However, it should be mentioned that a batch of hydrogen can also be defined as hydrogen produced based on energy from a black power generator such as a coal-based based power plant. Such black batch of hydrogen is however not as high value as a green batch, but similar considerations with respect to lifecycle data packages can be made to black hydrogen batches as is described throughout this document with respect to green batches of hydrogen.

Furthermore, providing lifecycle information to a customer, may yield an increased incentive to use hydrogen as fuel, which is advantageous. Such increased incentive could be the ability to follow the hydrogen from production to vehicle, establish green footprint per driven kilometer or per kg hydrogen, pricing, etc.

Generally, providing lifecycle information to a customer, allows the customer to be informed and make informed choices, which is also advantageous. Particularly, it may motivate the customer to choose hydrogen produced with the lowest possible environmental footprint. In turn, this may motivate the management of a hydrogen production facility to seek production solutions with lower environmental footprint, thus establishing a market feedback effect to the benefit of the environment. In the end making it possible to actively as individual be able to choose environment friendly choices.

Generally with respect to the clients of the supervisory system which on the one hand communicates with the central computer system and on the other hand communicates with one or the production facility, logistics, hydrogen refueling station, customer, etc. it should be mentioned, that the clients may be simple clients, i.e. clients which only purpose is to provide data to the supervisory system. Further, the clients may in embodiments be part of the controller, monitoring unit, etc. of the production facility, logistics, hydrogen refueling station, customer, etc. and thereby use communication interfaces thereof for communication with the central computer. Hence in embodiments, the clients may be embedded in control and/or monitoring logic of the associated facility and not a standalone part of the supervisory system.

According to an embodiment of the invention the hydrogen production facility is an electrolysis facility based on chlorine alkaline electrolysis, alkaline electrolysis, PEM electrolysis or a combination thereof.

The advantage of Alkaline and PEM electrolysis is well known to the skilled person and the selection of type of electrolysis can therefore be made based e.g. on requirements to purity of hydrogen or with respect to power source available for the electrolysis facility. It should be mentioned, that the production facility may include or at least partly include supply of hydrogen from a temporary storage, trailer fill station or the like.

According to an embodiment of the invention the hydrogen production facility includes a temporary hydrogen storage connectable to a tube trailer or is configured for direct connection to a tube trailer or a piping system.

The temporary hydrogen storage is advantageous in that it has the effect, that it is possible to build up a hydrogen storage that is faster to load to a tube trailer than loading the tube trailer as the hydrogen is produced. Further, it allows the production of hydrogen also when there is not tube trailer available.

The direct connection of a piping system to the production system has the effect, that hydrogen can be distributed directly to a customer without any handling is needed. This may save costs related to transporting and pressurizing prior to transporting in a tube trailer.

According to an embodiment of the invention the hydrogen supervisory control and data acquisition system further comprising a hydrogen logistics client, associated with distribution of at least a part of the plurality of batches of hydrogen, wherein the central computer system is configured to communicate with the hydrogen logistics client, and wherein the central computer system is configured to include information associated with the distribution of the part of the plurality of batches of hydrogen in the lifecycle data package.

In the context of the present invention, the hydrogen logistics client should be understood as comprising an active communication device which is located on a hydrogen tube trailer and that is configured for providing information of the hydrogen tube trailer to the central controller. In case the hydrogen is distributed by means of a piping system, the hydrogen logistics client may be reduced to e.g. a flowmeter providing feedback relating to flow in the piping system to the central computer system.

According to an embodiment of the invention the hydrogen logistics client is associated with a hydrogen tube trailer configured for transporting part of one of the plurality of hydrogen batches to the hydrogen receiving entity.

Including information received from a logistic client, in particular a logistic client communicating with a tube trailer, is advantageous in that it has the effect, that the environmental footprint of a particular part or subset of a batch of hydrogen is more accurate. Further it has the effect, that information such as location of tube trailer, remaining quantity of hydrogen in the tube trailer, etc. can be obtained which can be used by the central computer system to establish a hydrogen production plan, schedule and plan maintenance of tube trailer, plan routing for tube trailer between receiving entities, trailer swap, etc.

Using a tube trailer for is advantageous in that it has the effect, that distribution of hydrogen is made flexible i.e. there are not limitations to where a receiving entity can be located, as long as a tube trailer can access such location. Associating a logistic client with a tube trailer is advantageous in that information relating to pressure and remaining volume in one or more sections of the tube trailer can be communicated to the central computer. Further, location information of a fleet of tube trailers can be monitored e.g. via GPS systems positions on the individual tube trailers.

According to an embodiment of the invention the hydrogen logistics client (4) is associated with a hydrogen flow meter of a hydrogen pipe system configured for transporting a plurality of hydrogen batches to a hydrogen receiving entity.

Using a piping system is advantageous in that it has the effect, that large scale distribution of hydrogen can be made with almost no costs when the piping system is first established. Associating a logistic client with a flow meter is advantageous in that it has the effect, that the amount of hydrogen distributed via the piping system can be measured and thereby billed to the customer. Based on knowledge of flow during a time period, the mass of hydrogen delivered to the receiving entity can be calculated and billed.

As mentioned, a hydrogen receiving entity may e.g. be a fuel cell vehicle fueling site such as a hydrogen refueling station, a vehicle that can be filled directly from the tube trailer, a production apparatus using hydrogen in production of goods i.e. an industrial plant, where hydrogen is used in a manufacturing process, gas mixing process, or the like. Fuel cell vehicles includes light-duty vehicles, heavy-duty vehicles, airplanes, ships, etc.

According to an embodiment of the invention the hydrogen logistics client is communicating with a GPS on the hydrogen tube trailer and thereby configured for providing global position data of the hydrogen tube trailer to the central computer system.

This is advantageous in that it has the effect, that it is possible to locate and manage a fleet of hydrogen tube trailers including direct a given tube trailer to a specific customer such as a hydrogen refueling station.

According to an embodiment of the invention the hydrogen tube trailer is a MEGC trailer with a control and monitoring unit configured for controlling valves of the conduit system and thereby gas flow from gas sections to outlets of the MEGC trailer.

According to an embodiment of the invention the hydrogen supervisory control and data acquisition system further comprising a receiving entity client associated with a hydrogen refueling station and configured for acquiring information related to the fueling of a tank of a fuel cell vehicle.

This is advantageous in that it has the effect, that including this information in the lifecycle data package, the user of the fuel cell vehicle, can see from where the hydrogen stored at the hydrogen refueling station originates other information from the lifecycle such as environmental footprint and thereby determine if the fuel cell vehicle should be fueled at this or another hydrogen refueling station.

Fuel cell vehicle should in the contest of this invention be understood a light duty vehicle, heavy duty vehicle, airplane, ship and other types of transportation using fuel cells as energy source.

In the situation, where a tube trailer is used as storage of a hydrogen refueling station, information of the tube trailer may be communicated to the central computer system either from the receiving entity client or from the logistics client. Hence the monitoring of e.g. the remaining volume of hydrogen in e.g. a tube trailer at a particular site has the effect, that trailer swap can be initiate to avoid the risk of emptying the tube trailer before trailer swap. Accordingly, this has the effect, that production planning at the hydrogen production facility can be optimized.

With respect to billing, of hydrogen fueled to a fuel cell vehicle, to the owner of the fuel cell vehicle, relevant information to receive by the central computer system from the receiving entity client is price displayed on the price display at the fueling station, mass of hydrogen fueled to the vehicle and/or flow of hydrogen per second (time unit), time of the day and of the fueling, etc.

According to an embodiment of the invention wherein the receiving entity client is associated with an industrial plant using hydrogen in production.

This is advantageous in that it has the effect, that the user of the receiving entity client is able to order new hydrogen, adjust when new hydrogen automatically is to be ordered, etc. In the embodiment where the receiving entity client is associated with an industrial plant, the receiving entity client may be similar to a costumer client. Hence, the user of such receiving entity client may access or be provided with information related to the hydrogen used in production. This has the effect, that the hydrogen used in products of the industrial plant is traceable and hence if certification of the product is required, at least with respect to the hydrogen part thereof, documentation of e.g. environmental footprint can easily be obtained.

According to an embodiment of the invention the hydrogen costumer client is associated with a fuel cell vehicle.

This is advantageous in that it has the effect, that the user of the hydrogen customer client, which in this particular situation typically would be the owner or driver of the fuel cell vehicle, would have access to lifecycle information provided by the central computer system related to the batch of hydrogen which the fuel cell vehicle use as fuel. In addition, via the customer client, the user is able to pay for the fuel that loaded to the vehicle tank According to an embodiment of the invention the hydrogen supervisory control and data acquisition system further comprises a power supply client associated with a power generator configured to generate and/or deliver power to the hydrogen production facility.

Including a power supply client in the supervisory system is advantageous in that it has the effect, that information of pricing, type of energy source, etc. is provided to the central computer and can be used in its calculations, predictions, etc. which are thereby optimized and can be more accurate. Furthermore, more information and likely more precise and accurate information can be provided to the hydrogen customer client via the lifecycle.

Power generator in the context of the present invention is understood as any renewable power generation sources such as based on wind, solar, wave, thermal, etc. conventional power generation sources such as coal, oil, nuclear, etc. Furthermore, the power generator also includes the utility grid distributing power from the power generator to the hydrogen production facility. Hence information provided via a power supply client, may include grid related data provided by a grid operator and/or provided by a controller of the power supply production facility.

According to an embodiment of the invention the power supply client is configured for providing information of at least one of the list comprising: type of power generator, geographic location of the power generator, owner of power generator and cost of produced energy in a specified period of time.

Including such information in the lifecycle data package is advantageous in that it has the effect, that the lifecycle is personalized, and the customer therefore knows from which source power for producing his or her hydrogen origins.

According to an embodiment of the invention the hydrogen supervisory control and data acquisition system further comprises an environment client associated with a meteorological database.

Being able to provide meteorological information to the central computer is advantageous in that it has the effect, that the central computer can use this information in estimations related to production capacity, product planning, etc. Accordingly, the information received from the meteorological database is not necessarily relevant to the customer and therefore not necessarily part of the lifecycle data package.

According to an embodiment of the invention the central computer system is configured to establish a hydrogen production plan based on information received from the environment client and from the hydrogen customer client or from the receiving entity client.

Receiving environmental data directly from an environmental database or via an environment client and from the hydrogen customer client/receiving entity client is advantageous in that it has the effect, that expected future use and expected future hydrogen production based on a particular power generator can be established. Based thereon the central computer system can determine a production plan and allocate capacity at the hydrogen production facility to accommodate this. Further, in case the distribution is performed by tube trailers, one or more tube trailers can be booked to be ready to distribute the hydrogen when it is produced and before it is needed at the customer.

According to an embodiment of the invention the central computer system furthermore comprises at least one of the list comprising: Enterprise Resource Planning system, Customer Relation Management system and database.

Including an ERP system is advantageous in that it has the effect, that information comprised by the ERP system allows the central computer system to establish an invoice e.g. to the industrial plant or to the customer for the received quantity of hydrogen.

Including an CRM system is advantageous in that it has the effect, that e.g. costumers receiving a quantity of hydrogen can be identified and the invoice for the received quantity of hydrogen can be sent by email or mail to the customer.

Including a database is advantageous in that it has the effect, that information received from the clients can be stored and analyzed e.g. by the central computer. The result of the analysis of this data can be used in production planning, service and maintenance planning, customer support, risk management, logistics optimization, etc.

According to an embodiment of the invention the hydrogen supervisory control and data acquisition system is, by means of one or more clients, configured for monitoring part of the plurality of hydrogen batches during a period of time starting from when the part of the plurality of batches of hydrogen is produced to it is used.

Used in this context should be understood as used/consumed in the production at an industrial plant or used/consumed as fuel from a vessel of a vehicle.

Monitoring a plurality of batches of hydrogen from production to consumption is advantageous in that it has the effect, that complete lifecycle data package of a hydrogen batch can be established which adds additional value to the batch of hydrogen compared to batches of hydrogen not having metadata in the form of lifecycle data attached thereto. including information such as In an embodiment information related to consumption of the hydrogen e.g. in a fuel cell vehicle is acquired by the customer client and by the customer client used as basis for calculating a plurality different measures for the efficiency of the consumption. Alternatively, the information is passed on to the central computer and the calculation is made there. Such measures include average consumption, total distance drived on one refueling, etc. This kind of information may also be calculated by the fuel cell vehicle and provided from the vehicle to the customer client alternatively to the central computer directly or via the customer client.

According to an embodiment of the invention the central computer system is configured for determining a destination for a hydrogen tube trailer comprising part of a batch of hydrogen based on information received from the power supply client.

Being able to determine e.g. which fueling station that should be supplied with part of a given batch of hydrogen is advantageous in that it has the effect, that a particular fueling station or fuel cell owner can subscribe or choose hydrogen produced e.g. based on renewable energy e.g. from a particular wind turbine, wind park, photo voltage plant, etc.

According to an embodiment of the invention the central computer system is configured for monitoring the amount of produced hydrogen that is delivered to a particular fuel cell vehicle based on input from the hydrogen customer client that is associated with the particular fuel cell vehicle.

This is advantageous in that the user of the customer client associated with the fuel cell vehicle can be guaranteed hydrogen produced from sustainable sources and pay for the hydrogen. Alternatively, the central computer is provide with this information from a receiving entity client.

According to an embodiment of the invention the central computer system is configured for planning usage of the tube trailers to ensure equal usage of hydrogen tube trailers based on input from a plurality of hydrogen logistics client.

This is advantageous in that it has the effect, that wear of the tube trailers are equally distributed in a fleet of tube trailers.

According to an embodiment of the invention the central computer system is a cloud computer system According to an embodiment of the invention hydrogen supervisory control and data acquisition system is configured to include hydrogen batch metadata in the lifecycle data package.

Hydrogen batch metadata includes relevant information related to production facility type, production facility location, production facility power supply, energy consumption related to producing a batch of hydrogen, time of production, etc.

All or a subset of this metadata related to a batch of produced hydrogen has the effect, that it adds values to the produced batch of hydrogen in that based thereon it is possible to e.g. supply a customer with hydrogen from a particular production facility from which the customer is willing to pay more per batch compared to batches from other production facilities.

Further, with respect to record keeping of samples of quality of batches of hydrogen this metadata is advantage in that it has the effect, that it may be easier to find the source of e.g. a quality issue.

According to an embodiment of the invention the hydrogen supervisory control and data acquisition system is configured to establish environmental footprint data and to include information of this environmental footprint related to production of a batch of hydrogen and transportation of the batch of hydrogen in the lifecycle data package.

This is advantageous in that it has the effect, that the customer is informed about the environmental footprint of the part of hydrogen batch he or she is using.

According to an embodiment of the invention the hydrogen supervisory control and data acquisition system is configured to include in the lifecycle data package, information selected from the list comprising: special hydrogen offerings, operational status of selected hydrogen refueling stations, hydrogen price, type of energy source used to produce the hydrogen.

Such information is provided by the central computer based on analysis of relevant data received from the clients and/or databases of the central computer. This is advantageous in that it has the effect, that the customer can buy hydrogen cheaper, avoid driving to a fueling station which is out of order, etc. From the perspective of the hydrogen vendor, it is advantageous in that it can be used to so-called nudging of hydrogen buyers.

According to an embodiment of the invention the hydrogen supervisory control and data acquisition system according to any of the proceeding claims, wherein a batch of hydrogen is defined by an amount of energy used by the hydrogen production facility to produce hydrogen.

This is advantageous in that it has the effect, that knowledge of amount of energy produced by a renewable power generator and used by the hydrogen production facility, can be used to classify a batch of energy as green hydrogen and thereby increase market value of this batch of hydrogen.

According to an embodiment of the invention the hydrogen supervisory control and data acquisition system according to any of the proceeding claims, wherein the supervisory control and data acquisition system comprise at least one standalone client facilitating two-way between the standalone client and the central computer system and at least one customer client embedded in a smartphone.

According to an embodiment of the invention the hydrogen supervisory control and data acquisition system according to any of the proceeding claims, wherein the central computer system is configured to stop production of one batch of hydrogen and start production of another batch of hydrogen in case a source of power to the production facility change.

This is advantageous in that it has the effect, that if the power generator producing energy to the production facility change from black to green or vice versa, the production facility physically change storage of the hydrogen it produces so that black hydrogen is in one storage and green is in another. Alternative, time during which the production facility is powered from a renewable power generator and time the production facility is powered from a fossil power generator is recorded as well as the amount of hydrogen produced during these times. At the end of the production period, one part of the produced hydrogen is defined as green and the other is defined as black.

According to an embodiment of the invention, the central computer is configured to receive storage capacity information from at least one of the list comprising: one production facility client, one hydrogen customer client and one logistics client.

According to an embodiment of the invention, the central computer is configured to establish storage capacity mapping of available storage capacity based on the received storage capacity information.

This is advantageous in that it has the effect, that based on information of available storage in the chain from production facility to consumer, the central computer is able to establish hydrogen production planning. Accordingly, available capacity of storage of hydrogen fill stations and tube trailers are most relevant in that the volume thereof is larger. However, a plurality of vessels of fuel cell vehicles may also contribute to increase the available part of a storage of a hydrogen refueling station and hence information from clients associated with fuel cell vehicles may also be relevant. Product planning may also include producing when prices are low i.e. optimize production to price and weather.

Moreover, the invention relates to a method of monitoring a batch of hydrogen (H2-$x$) from it is produced to it is filled into a storage at a receiving entity and ready to be consumed, the method comprising the steps of: Establish data communication between a hydrogen production facility client and a central computer system, and between a hydrogen customer client and the central computer system. Receive, by the central computer system, from the hydrogen production facility client, information related to the production of the batch of hydrogen (H2-$x$). By the central computer system establish a lifecycle data package of the batch of hydrogen (H2-$x$) based on the information received from the hydrogen production facility client and hydrogen customer client, and providing to the hydrogen customer client, at least part of the lifecycle data package from the central computer system.

According to an embodiment of the invention, the method further comprises the steps of establish data communication between a logistic client and the central computer system. Receive, by the central computer system, from the logistic client information related to distribution of the batch of hydrogen (H2-$x$), and update the lifecycle data package based on information received from the logistics client.

According to an embodiment of the invention, the central computer receives storage capacity information from connected clients and based on the received storage capacity information, establishes storage capacity mapping of available storage capacity.

According to an embodiment of the invention, the central computer (7) establishes production references and communicates these to the production facility client (2) and thereby to the production facility (3), based on the received storage capacity information and/or information received from a power supply client (10) and/or from an environment client (12).

According to an embodiment of the invention, the lifecycle data package includes information to the customer selected from the list comprising: special hydrogen offerings, operational status of selected hydrogen refueling stations, hydrogen price, type of hydrogen, hydrogen batch metadata, environmental footprint related to production of a batch of hydrogen and related to transportation of the batch of hydrogen, information associated with the power source of the hydrogen production, information associated with the facility at which the hydrogen is produced.

THE DRAWINGS

Figure 2:
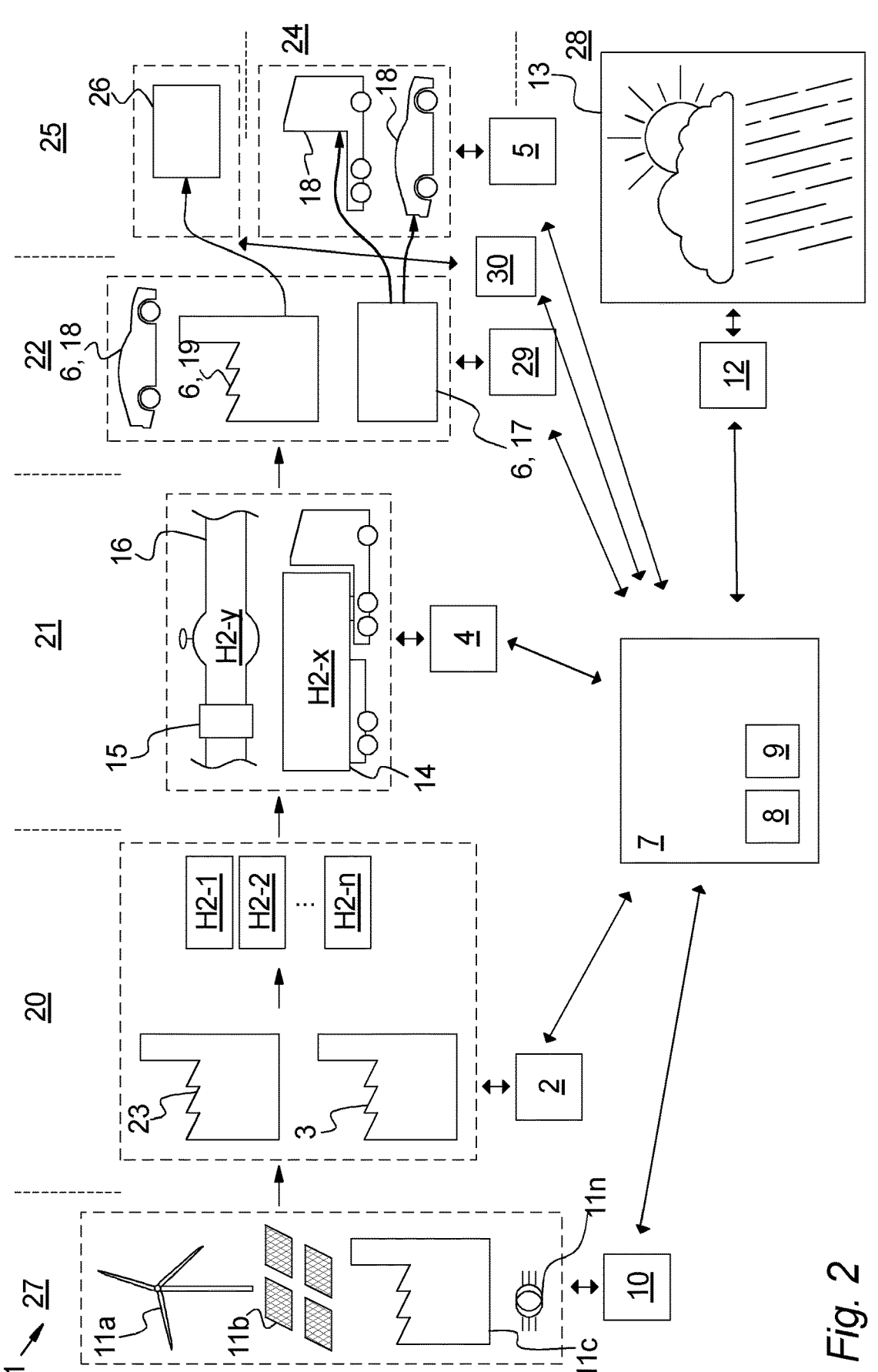

Various embodiments of the invention will in the following be described with reference to the drawings where FIG. 1 illustrates a first embodiment of the hydrogen supervisory system according to the invention, and FIG. 2 illustrates a second embodiment of the hydrogen supervisory system according to the invention.

DETAILED DESCRIPTION

FIG. 1 illustrates a schematic overview of a hydrogen supervisory control and data acquisition system 1 according to an embodiment of the invention. The system 1 facilitates monitor at least a part H2-$x$ of a plurality of batches of hydrogen H2-1, H2-2, . . . H2-$n$ from production 20, through distribution, 21, until a customer or consumer receives it 22. Note that even though the present invention is referred to as a supervisory control and data acquisition system interaction/control of elements of the system may not always be possible. Hence, in embodiments only the data acquisition part is used to acquire data which is then centrally stored/processed and at least partly made available to clients/users of the system.

The hydrogen supervisory system 1 may perform data acquisition and monitoring of its associated elements, establish and communicate control signals thereto, receive data/control signals from the elements and receive data from one of the elements and communicate these to another element. In its simplest version (illustrated in FIG. 1), the supervisory system 1 communicates with a production facility 3 and a receiving entity 6. The elements of the supervisory system 1 enabling this communication is referred to as clients, hence in FIG. 1 a hydrogen production facility client 2 and a hydrogen customer client 5 is illustrated.

Thus, based on the data communication between the elements 3, 6 and the clients 2, 4 and between the clients 2, 4 and the central computer 7 of the hydrogen supervisory system 1, the hydrogen supervisory system 1 is able to monitor the lifecycle of a plurality of batches of hydrogen (H2-1, H2-2, . . . H2-n) produced at the production facility and consumed by a customer.

The clients are software clients which "downstream" is developed to communicate with a particular element and "upstream" is developed to communicate with the central computer system 7. Being develop to a particular element means that it is developed to communicate with a controller e.g. of a hydrogen production facility to receive predetermined data related to the production of hydrogen and pass this date upstream to the central computer system. Further, such hydrogen production facility client may be developed to be able to pass control signals on downstream to the controller of the hydrogen production facility from the central control system. This may be relevant if the central computer system, based on input from other elements/clients can predict that a quantity or batch of hydrogen is to be needed at some point in the future. Hence, control signals in this context may include start or stop of production, adjust production to ensure a given quantity of produced hydrogen at a given point in time, etc.

The clients of the supervisory system 1 may be standalone client embedded in standalone hardware which is communicating with the sensors and/or controllers of the associated element. Alternatively, a client may comprise its own sensors installed at the associated element. Sensors should be understood as any kind of sensors relevant for the information required from or usable at the central computer 7 including, but not limited to position (GPS) sensors, temperature sensors, pressure sensors, flow sensors, power meters, counters, timers.

The standalone clients may comprise control logic, data storage, communication interface and if relevant user interface. The control logic may in advanced clients comprise a programmable logic controller and in less advanced clients an embedded microprocessor. Accordingly, the clients of the supervisory system may be more or less advanced and thus also comprise more or less storage capacity, communication possibilities, etc. Hence, a client can be developed to be anywhere between a less advanced client which simply receive data from an associated element and pass that data on to the central computer system and an advanced client which facilitates processing of received data before passing the data on to the central computer system. Typically, control signals sent downstream from the central computer system is passed on by the clients without any processing.

More specifically, the clients may be an integrated part of a controller of an element, if the element has a controller.

This is typically the situation with a hydrogen production facility, but not necessarily the situation with a tube trailer. Hence, on a tube trailer without a controller the client most often would be a standalone client whereas on a production facility it may be integrated in the existing controller or implemented as a standalone unit.

Alternatively, the client may be developed as an application for a smartphone. This is particularly relevant for the customer client, when the customer is the owner of a fuel cell vehicle. This is because installing a standalone client in any fuel cell vehicle communicating with the central computer would be a tremendous task compared to the task of installing an application on a smartphone. When the customer is the owner of a fuel cell vehicle, typically the smartphone would be in the fuel cell vehicle when the fuel cell vehicle is in operation i.e. is driving. Hence, position data and data vehicle data accessible from the vehicle may be retrieved from the vehicle e.g. via Bluetooth and forwarded/processed and forwarded to the central computer by the smartphone via mobile data network.

Communication in the supervisory system is typically two-way communication, e.g. between the central computer system 7 and the hydrogen production facility 3, but in some embodiments, one or more of the clients 2,4-5 may perform one-way communication, e.g. from the central computer system to a meteorological database or power grid operation client.

With respect to safety the communication to and from clients are not critical and does therefore not need to be redundant or SIL 2 compliant. However, communication between trailer filler and tube trailer and hydrogen refueling station and fuel cell vehicle need to be safe complying with SIL 2 requirements (IEC 61508)

This may be the case with a group of less advanced clients belonging to the type of clients which main purpose is to provide the central computer system with information from a database or system relevant to e.g. production of hydrogen. Such system may be e.g. by the utility grid or power production plant from which the central computer most often would need data and not provide data to. Another such system could be a meteorological system or database. Clients of such systems could easily be implemented as a simple piece of software located on the central computer especially if such systems make the needed information accessible via the Internet.

As can be understood from the above description of a client of the supervisory system, a client according to the invention is not limited to a particular type of hardware or software which may be chosen as the most appropriate with respect to the element it should be associated with by a skilled person. Further, the supervisory system in an embodiment comprise at least one standalone client facilitating two-way communication such as a production facility client and at least one client embedded in a smartphone such as a customer client. In another embodiment, the supervisory system further comprises at least one client facilitating one-way communication upstream to the central computer system such as a meteorological client or a power supply client.

Typically, some of the clients are configured to receive data and/or information relating to the plurality of batches of hydrogen H2-1, H2-2, . . . H2-n, which can be communicated to the central computer system 7. In some embodiments, this data is received and communicated automatically, and in some embodiments, manual user input is required. The central computer system 7 is not required to be at any particular physical location, but typically, the clients

2,4-5 are located at or near their associated elements, e.g. a hydrogen production facility client is typically located at the hydrogen production facility.

Further, a supervisory system 1 according to the invention may comprise different types of clients. For example a supervisory system 1 comprises a first hydrogen production client at a first hydrogen production facility and a second hydrogen production client at a second hydrogen production facility, wherein the first and second hydrogen logistic client are different, e.g. the first hydrogen production client is based on a programmable logic controller configured to automatically communicate information to the central computer system 7, and the second hydrogen production client is based on software on a computer which requires manual input from a user to communicate information to the central computer system 7.

A hydrogen production facility 3 produces a plurality of batches of hydrogen (H2-1, H2-2, . . . H2-*n*). The hydrogen production 3 facility may for example be a hydrogen production facility based on alkaline electrolysis, PEM electrolysis, or a combination hereof, but hydrogen production facilities according to the invention are not limited to any particular type of hydrogen production facilities.

A batch of hydrogen is used to define a particular quantity of produced hydrogen, hence a batch of hydrogen may be the hydrogen produced within a given period of time, based on power supply from a particular power source such as a particular type of power generator or from a particular plant (e.g. photovoltaic plant or wind park). In this way, if e.g. a tube trailer is loaded with hydrogen from one batch, referred to as H2-*x*, and delivered to a hydrogen refueling station, then based on input from relevant clients of the supervisory system a lifecycle data package related to the subset, referred to as H2-*xx*, filled into a vehicle tank can be established and provided to the user for information, used for billing and maintenance purposes, etc.

Hence, if during production of hydrogen the power supply source change, this may initiate a stop of production of one batch and the start of production of another batch. This change from one batch to another may be done automatically and the hydrogen belonging to the first batch may be temporally stored in one a first storage/tube trailer whereas the hydrogen belonging to the second batch may be temporally stored in a second storage/tube trailer. Accordingly, if hydrogen of the first batch is produced based on fossil fuel and of the second batch green energy, then if power supply from these sources changes during the day, the temporary storage also changes.

Alternatively, at the end of the day (or production period) based on information received from the clients, the central computer may calculate how much of the days/periods hydrogen that is produced based on energy from a renewable power generation source belonging to a first batch and how much is produced based on energy from a fossil based power generation source belonging to a second batch. Based hereon, when a tube trailer is loaded with hydrogen at the production facility, the central computer keeps track of the loaded quantity and thereby which to which batch the loaded hydrogen belongs. No matter, how this is handled, it makes it possible for the central computer to include origin of power for production of a batch of hydrogen to the lifecycle data package for the particular batch of hydrogen.

Referring to the embodiment illustrated on FIG. 1, the hydrogen production facility 3 is associated with a hydrogen production facility client 2, which performs two main tasks. First, it acquires information related to the production of the plurality of batches of hydrogen H2-1, H2-2, . . . H2-*n*, and second, it communicates at least part of this information to a central computer system 7.

The acquired information related to the production of hydrogen comprises time stamps, a hydrogen production facility identifier, quantity of produced batches of hydrogen, a representation of the power consumption used to produce the plurality of batches of hydrogen H2-1, H2-2, . . . H2-*n*, type of power (produced by renewable (wind, solar, etc.) or fossil fuel power plant), etc.

Even though a plurality of batches of hydrogen H2-1, H2-2, . . . H2-*n*, is produced, the information related to the production of the plurality of batches of hydrogen H2-1, H2-2, . . . H2-*n* may comprise information relating to individual batches. Typically, the information comprises a digital identifier which is unique to each of the batches.

In an embodiment the hydrogen production facility client 2 is a computer system, which is able to automatically acquire information, and which is communicatively connected to the central computer system 7 via an internet connection. In other embodiments, data is provided to the hydrogen production facility client 2 and forwarded to the central computer system 7 manually, e.g. by an employee at the hydrogen production facility 3. In some embodiments, information is acquired and forwarded to the central computer system 7 partly manually and partly automatically.

Further, as illustrated in FIG. 1, one or a part H2-*x* of one batches of hydrogen H2-1, H2-2, . . . H2-*n* is distributed by a hydrogen tube trailer 14, which is a typical method of distributing hydrogen. However, the invention is not limited to any particular type of hydrogen distribution.

In the illustrated embodiment, the batch or part thereof H2-*x* is transferred from the hydrogen tube trailer 14 to a hydrogen refueling station 17, from where the hydrogen is ready to be fueled onto one or more fuel cell vehicles 18. In FIG. 1 a subset H2-*xx* of the part H2-*x* is delivered to the hydrogen refueling station, hence another not illustrated subset of the part H2-*x* remaining in the tube trailer may be delivered to another hydrogen refueling station. A hydrogen refueling station 17 is an example of a receiving entity 6, but the invention is not restricted to any particular type of hydrogen receiving entities 6.

The hydrogen tube trailer 14 which in this embodiment is used to transport the part H2-*x* of the batches of hydrogen may also be utilized as a hydrogen storage of a hydrogen refueling station 17 or as fueling station. As such, transferring hydrogen from a hydrogen tube trailer 14 to a hydrogen refueling station 17, may also be understood as arranging the tube trailer 14 to function as a hydrogen storage of the hydrogen refueling station 17 or dumping off hydrogen to a storage of the hydrogen refueling station.

Entities receiving hydrogen 6 are associated with a hydrogen customer client 5, which are configured to receive information relating to the subset H2-*xx* or handing of the subset H2-*xx* of a hydrogen batch from the central computer system 7. In addition, the hydrogen customer client 5 may communicate information relating to the subset H2-*xx* or handing of the subset H2-*xx* of a hydrogen batch at the receiving entity to the central computer system 7.

When the subset H2-*xx* of the hydrogen batch is transferred from the tube trailer to the receiving entity, at the central computer system, the lifecycle data package is automatically updated with information related to the particular receiving entity receiving the subset H2-*xx* of the hydrogen batch. Hence, the updated lifecycle data package is available to the hydrogen customer client 5 which may download part of the information of the lifecycle data package or present information therefore to the user from the central computer without downloading it locally e.g. on the application of the smartphone if this is how the customer client is implemented.

The lifecycle data package may thus be updated with information related to the receiving entity obtained via the customer client. In this way, the central computer system 7, maintains the monitoring of the hydrogen molecule so to speak through the various steps of the hydrogen lifecycle (production, distribution, consumption, etc.).

Preferably, no later than when the subset of hydrogen H2-*xx* has been received by a receiving entity 6, the central computer system 7 has updated and made available to the customer client, the lifecycle data package with information relating to which batch the subset H2-*xx* origins from, which hydrogen tube trailer 14 transported it, which receiving entity 6 has received it, etc. As mentioned, this information is included in the lifecycle data package, by the computer system 7 based on received information from at least the hydrogen production facility client 2 and optionally, the hydrogen customer client 5. The lifecycle data package is stored digitally in a data storage 9.

The lifecycle data package is then accessible to the hydrogen customer client 5 such that a customer may access this information. The customer may be associated with the hydrogen refueling station, e.g. a manager/owner of the hydrogen refueling station which receives the subset of hydrogen or the customer may be the owner of a fuel cell vehicle 18 receiving hydrogen of the subset of hydrogen from the hydrogen refueling station 17, e.g. through a standard purchase and fueling procedure.

The supervisory system comprises a central computer system 7 comprises a data processor 8, for processing any received information and data, and a data storage 9 for storing information and data. In some embodiments, the central computer system 7 is implemented as a central server such as a cloud server. In some embodiments the central computer system 7 is based on cloud storage, e.g. spanning multiple servers communicatively connected. Preferably, the lifecycle data package is storage and/or accessible from the data storage 9 which may be implemented as part of the central or cloud server.

When referring to a lifetime data package, a reference is made to a data set, that is associated with one or more Hydrogen molecules i.e. with a batch or part of a batch of produced Hydrogen. This data set would, as mentioned above, typically be stored centrally from where clients of the system is able to access the data set. In this way e.g. a driver of a fuel cell vehicle can access the data set and see e.g. where the Hydrogen was produced, cost of production, cost of transportation, etc. Cost here should include both economic and environmental.

The central computer system may use the information received without providing the information to other clients/users. Such internal use may be production planning, logistic planning, etc. The information received from the one or more clients may together be referred to as life cycle data package. Hence, if only information is received from e.g. the production facility client, this information may be referred to as life cycle data package.

In some embodiments of the invention, a customer may receive at least a part of the lifecycle data package. This information is provided to the customer through the hydrogen customer client 5, for example via a digital communicative device, e.g. a smart phone, a computer, or a tablet, which is arranged to receive a part of the lifecycle data package. The at least a part of the lifecycle data package may also be provided visually to the customer by a digital display device, e.g. located at the hydrogen refueling station 17, such that the customer does not need to possess any data from the hydrogen customer client 5 to receive the at least a part of the lifecycle data package. Hence, the customer client may provide the information to such display device.

The at least a part of the lifecycle data package which is provided to a customer may for example be information indicative of the hydrogen production facility 3 and a time stamp relating to the production of the part H2-*x* or subset H2-*xx* of a batch, which the hydrogen refueling station 17 has received or is filled into the tank of a fuel cell vehicle.

In some embodiments, the customer receives information indicative of the power consumption and/or the type of power generation, e.g. wind power plant or fossil fuel power plant, relating to the production of the batch.

The control system is using part of the data in the database as input to algorithms which are determining one or more of the list comprising: starting or stopping the production of hydrogen, tube trailer fleet control, predictive maintenance, etc. Further, from part of the data in the data base and thereby received from the one or more clients, the control system knows capacity in logistics i.e. a fleet of tube trailers, hydrogen on stock at one or more hydrogen storages, contractual obligations, etc. all of which can be used as input to production and distribution planning, maintenance planning, etc.

In some embodiments, the central computer system 7 provides a production plan for a hydrogen production facility, based on information of at least one lifecycle data package. For example, the central computer system establishes how much hydrogen is available at a hydrogen refueling station 17, based on data received from a hydrogen production facility client 2 and a hydrogen logistics client 4, e.g. by receiving information indicative of the amount of hydrogen produced at the hydrogen production facility 3 and the hydrogen distribution via a hydrogen tube trailer 14. And based on the amount of hydrogen available at the hydrogen refueling station 17, a production plan may be established, e.g. if the central computers system estimated that an amount of hydrogen available at the hydrogen refueling station 17 is below a pre-established threshold.

In some embodiments, a production plan may be established based on a prediction of hydrogen demand, for example by means of forecasting using historical data. In some embodiments, a production plan may be established based on availability or predicted availability of hydrogen tube trailers. In some embodiments, a production plan may be based on power generation, e.g. hydrogen is scheduled to be produced in periods where a relatively large wind-based power generation is predicted.

In some embodiments, the central computer system 7 provides a warning based on information of at least one lifecycle data package, for example if the central computers system estimated that an amount of hydrogen available at the hydrogen refueling station 17 is below a pre-established threshold.

In some embodiments, the central computer system 7 may establish a maintenance plan based on information of at least one lifecycle data package. For example, hydrogen tube trailers 14 may be monitored and/or predicted using at least one lifecycle data package which comprises information indicative of which hydrogen tube trailers 14 are currently distributing hydrogen, and the central computer system 7 scheduled a hydrogen tube trailers 14 not distributing hydrogen for maintenance.

Typical elements of the supervisory systems according to the invention is a plurality of hydrogen production facilities 3, a plurality of hydrogen tube trailers 14 and a plurality of hydrogen receiving entities 6, e.g. hydrogen refueling stations 17. As such, the system is able to provide supervisory control and data acquisition of a supply chain network. For example, the supervisory system may comprise at least two hydrogen production facilities, each with a hydrogen production facility client, more than two hydrogen tube trailers, each with a hydrogen logistics client, and more than two receiving entities, each with a hydrogen customer client 5. The central computer system may monitor any part of any batch of hydrogen produced at any of the hydrogen production facilities of the supervisory system. Any of the hydrogen tube trailers may be filled with hydrogen at any of the hydrogen production facilities and may supply hydrogen to any of the receiving entities, while the central computer system receives information thereof accordingly. When any customer receives or purchase hydrogen of a part of a plurality of batches of hydrogen, the customer receives or is allowed to access at least part of the information of the lifecycle data package related to the batches of hydrogen of which the customer has board a subset.

Each client of the hydrogen production facility client 2, hydrogen logistics client 4, and hydrogen customer client 5 according to the invention should preferably be communicatively connected to the central computer system 7.

In some embodiments, the hydrogen logistics client 4 is located on a hydrogen tube trailer 14 and comprises local or near-field communication, wherein information is provided to the central computer system 7 when the hydrogen tube trailer 14 is at a hydrogen production facility 3 and/or at a hydrogen refueling station 17, where the hydrogen logistics client 4 may utilize a communicative connection to the central computer system 7 available at the hydrogen production facility 3 and/or the hydrogen refueling station 17 through the local or near-field communication.

The near-field communication may for example be based on RFID technology, and local communication may for example be Bluetooth, but the invention is not limited to these examples, and may be chosen accordingly by a skilled person. A client may also establish a communicative connection to the central computer system 7 at least partially based on a wired connection, wireless data communication via WiFi or mobile data.

Further, as illustrated in FIGS. 1 and 2, one or a part H2-$x$ of one batches of hydrogen H2-1, H2-2, . . . H2-$n$ is distributed by a hydrogen tube trailer 14, which is a typical method of distributing hydrogen. However, the invention is not limited to any particular type of hydrogen distribution and may also include a piping system 16 for distributing the hydrogen as illustrated on FIG. 2. The hydrogen distribution 21 is associated with a hydrogen logistics client 4, which keeps track of the part H2-$xx$ of the batch of hydrogen being distributed.

When the part H2-$xx$ of a hydrogen batch is transferred from the hydrogen production facility 3 to the hydrogen tube trailer 14, the lifecycle data package of the hydrogen batch part H2-$xx$ is updated with information of which trailer 14 it is now located at. The update is made by the central computer based on information from the hydrogen production facility client 2 and/or the hydrogen logistics client 4. Once updated, the information of the lifecycle data package is accessible to the clients of the supervisory system 1 and to other external computer systems. In this way, the supervision of the hydrogen batch is sustained through the various steps of the hydrogen lifecycle.

For example, in an embodiment, the lifecycle data package related to the part H2-$xx$ of a batches of hydrogen is in the central computer system associated with a unique digital identifier. Such identifier may be a name or number under which the information of the lifecycle data is stored in the storage 9 of the computer system. With reference to this unique digital identifier information related to the production of the part H2-$xx$ of a batch of hydrogen is stored. Such information is received from the hydrogen production facility client 2 associated with the production facility 3 at which the part H2-$xx$ was made. When loaded onto a hydrogen tube trailer 14, the central computer system receives information of the particular tube trailer from the production or logistics client 2, 4 and updates the lifecycle data package with this information.

This information may be sent manually and/or automatically to the central computer system 7 through the hydrogen production facility client 2, the hydrogen logistics client 4, or a combination of these. Consequently, the central computer system 7 stores or updates the life cycle data package information relating to the production and relating to hydrogen tube trailer 14.

Alternatively, the central computer system has established a production and distribution plan, so that the tube trailer 14 used for distribution of a particular batch of hydrogen is determined by the central computer system 7. In this embodiment, the lifecycle data package is at least partly update automatically without input from any of the clients.

In some embodiments, the hydrogen logistics client 4 is used to provided information to person driver of the hydrogen tube trailer 14, related to for example destinations/routing of the hydrogen tube trailer, required actions to perform at the target destination, etc.

In some embodiments, the hydrogen logistics client 4 receives input from a sensor unit arranged to monitor a physical state of hydrogen gas loaded on the hydrogen tube trailer. A sensor unit may for example monitor the pressure of the hydrogen gas, and a representation of this pressure may be communicated to the central computer system 7. Thus, the central computer system may establish a geographic overview of real-time distribution hydrogen tube trailers 14.

FIG. 2 illustrates a schematic overview of a hydrogen supervisory control and data acquisition system 1 according to another embodiment of the invention. The supervisory system 1 comprises elements similar to those of the embodiment shown in FIG. 1, e.g. a hydrogen production facility 3, a hydrogen tube trailer 14, a hydrogen refueling station 17 arranged to perform fueling of fuel cell vehicles 18, and clients 2, 5 facilitating communication to a central computer system 7. Where the supervisory system illustrated on FIG. 1 is simple system i.e. including only a few elements and clients, the supervisory system 1 illustrated on FIG. 2 is a more advanced system i.e. including additional elements and clients compared to the system of FIG. 1. The additional elements and clients will now briefly be discussed.

Additionally, the hydrogen distribution 21 of the embodiment illustrated in FIG. 2 comprises a hydrogen piping system 16. The hydrogen piping system 16 is arranged to distribute at least a part H2-$y$ of a batches of hydrogen to a receiving entity 6. The receiving entity 6 supplied with hydrogen from a piping system 16 is preferred if the consumption of hydrogen at the receiving entity is large or have high peak consumption. As an example, an industrial plant using hydrogen in production or a large hydrogen refueling station having several dispensers may have high enough consumption to be supplied from a piping system 16.

Alternatively, distance between a receiving entity 6 and a hydrogen production facility 3 balances with consumption may also indicate that supply from a piping system 16 is advantageous over supply from a trailer 14.

The piping system 16 may comprise at least one hydrogen flow meter 15, arranged to measure the amount of hydrogen being distributed through the associated hydrogen piping system 16. The flow meter is communicatively connected to the central computer system 7 through a hydrogen logistics client 4. Alternatively, the hydrogen flow meter 15 is communicating with the central computer system directly i.e. without a hydrogen logistics client 4.

Further, as mentioned in relation to FIG. 1, hydrogen may also be distributed by a plurality of tube trailers 14 (only one is illustrated). As such, the hydrogen tube trailer 14 is able to distribute a or part H2-$x$ of a batches of hydrogen H2-1 and the hydrogen piping system 14 is able to distribute part of the same hatch H2-1, a or a part H2-$y$ of another batch of hydrogen. As described with respect to the hydrogen production 20, preferably, each hydrogen tube trailers 14 comprise an individual hydrogen logistic client 4. The same is true for the piping system 16 if it need a hydrogen logistic client 4.

The embodiment illustrated in FIG. 2 comprises a hydrogen byproduct facility 23, which may be understood as an industrial facility which yields hydrogen as a byproduct. Hydrogen as a byproduct may for example be obtained from waste biomass, chlor-alkali plants, reduction furnace operations, and hydrocarbon waste. The hydrogen production 20 of a supervisory system 1 according to the invention may thus comprise a plurality of hydrogen byproduct 23 facilities and or a plurality of hydrogen production facilities 3 (only one of each is illustrated) which participates in producing the plurality of batches of hydrogen (H2-1, H2-2, . . . H2-$n$), which is monitored. In addition, hydrogen could also be produced as main product from an hydrogen production process which is not an electrolyser process.

Embodiments of the invention may comprise communication with any number and any combination of hydrogen production facilities 3 and hydrogen byproduct facilities 23, which each participate in producing the plurality of batches of hydrogen (H2-1, H2-2, . . . H2-$n$). Accordingly, it is preferred, that one production facility client 2 is developed to each of hydrogen production facility 3, 23 and that each of these production facility clients 2 communicated directly to the central computer system 7.

Additionally, the embodiment illustrated in FIG. 2 comprises a power supply client 10, which is associated with power generation 27. The power generation may be understood as a facilities 11$a$-11$n$ which produces or distributes electrical power which is used for production of hydrogen. The electrical power produced by a power generator may typically be provided to the hydrogen production through a utility power grid 11$n$, but is not restricted to this method of providing power (local power production at site of the production facility may be possible). Examples of power generators are wind turbines, photovoltaic power stations, concentrated solar power stations, nuclear power plants, biogas plants, fossil fuel power stations, hydroelectric power stations, geothermal power stations, tidal power stations, and wave power stations, but power generators according to the invention are not limited to these examples. The power generators can be divided in renewable or green power generators such as wind turbines 11$a$ and photovoltaic power plants 11$b$ and fossil or black power generators such as coal powered power plant 11$c$.

The hydrogen production facility 3 may have contractual obligations to use green or black power or a combination thereof. Hence at some of these known power generators 11, a power supply client 10 may be installed. A power supply client 10 may communicate information to the central computer system 7. Such information may include type of power generator 11$a$-11$c$, geographic location of the power generator 11$a$-11$c$, owner of the power generator 11$a$-11$c$, and/or cost of energy produced in a specified period of time, etc.

Alternatively, the power generator is configured to send such information to the central computer system 7. In yet an alternative, the central computer system is configured to query such information from a power generator or grid operator. In both the alternatives, the power supply client may not be a physical box comprising hardware, but rather a short software program. In yet an alternative, the power supply client 10 may be installed at a grid operator managing the utility grid 11$n$ and thereby comprise knowledge or which power generators that delivers power to the grid during specific periods of the day.

In some embodiments of the invention, a client communicating with the a hydrogen production facility, e.g. a hydrogen production facility client 2, may directly receive information relating to power generated and/or delivered to a hydrogen production facility 3, e.g. independent of a power supply client 10, and communicate this information to a central computer system 7.

Additionally, the embodiment illustrated in FIG. 2 comprises a meteorological database 13 and an associated environment client 12. The meteorological database may preferably comprise a weather forecast, which is relevant for power generation of power generators, e.g. wind turbines 11$a$. The environmental client 12 communicates meteorological information of the meteorological database 13 to the central computer system 7. Based on the this, the central computer system may for example establish a production plan, e.g. plan to increase hydrogen production in a period of time where more than average wind is predicted, during which wind turbines may yield increased power. This may allow reducing the environmental footprint of hydrogen production as well as decreasing costs. As mentioned above, the environmental client 12 may be in the group of less advanced clients, hence the implementation of the environmental client 12 may be software installed on the meteorological database 13 configured to update the central computer with weather information. Alternatively, the environmental client 12 may be software installed on the central computer system 7 configured to retrieve relevant meteorological data.

In addition to the embodiment illustrated on FIG. 1, the embodiment shown in FIG. 2 comprises further examples of receiving entities 6 in the form of a fuel cell vehicle 18, an industrial plant using hydrogen in production 19, and a hydrogen refueling station 17. As above only one of each of these receiving entities 6 are illustrated for simplicity, knowing that typically there will be a plurality of each of type of receiving entities. This is at least true for the hydrogen refueling station type of receiving entity.

In the embodiment illustrated in FIG. 2 the receiving entities 6 is split between entities receiving hydrogen 22, output of industrial process using hydrogen 25 and customers 24. The entities receiving hydrogen denoted 6 on FIG. 2 may each communicate with the central computer system 7 via individual receiving entity clients 29. Similarly, the customers 24 i.e. the fuel cell vehicle 18 or the owners thereof may also communicate with the central computer system 7 via individual customer clients 5. If relevant a product produced using hydrogen 26 may be tracked via a product client 30.

In industrial plants using hydrogen in production 19, hydrogen may for example be used in production of carbon steels, special metals, and semiconductors, or employed as a reducing agent or a carrier gas for electronics and gas chromatography. It may further be used as a raw material in chemistry, e.g. for manufacturing ammonia and methanol, or as a redactor agent in the metallurgic industry. It may further be used for processing of intermediate oil products, e.g. in refineries. An industrial plant using hydrogen in production 19 may thus typically yield an industrial product produced using hydrogen 26.

In some embodiments, one or more hydrogen customer clients 5 are associated with an industrial plant using hydrogen in production 19 and/or an industrial product produced using hydrogen 26. Any of these clients 5 may for example facilitate communication with the central computer system 7. An industrial plant using hydrogen in production 19 may for example receive part of a lifecycle data package, relating to the hydrogen used in production, or it may for example provide information to the central computer system 7, relating to the production using hydrogen, which the central computer system 7 may use, for example to update a lifecycle data package. An industrial product produced using hydrogen 26 may for example receive part of a lifecycle data package, relating to the hydrogen used in production, for example, the product 26 may receive a sticker, a stamp, or a digital stamp indicating the carbon footprint, which have been estimated based on a lifecycle data package.

A hydrogen tube trailer 14 may perform direct fueling of a fuel cell vehicle 18, i.e. load a fuel cell vehicle 18 with hydrogen from the hydrogen tube trailer 14 without an intermediate hydrogen refueling station (illustrated in FIG. 1). In some embodiments of the supervisory system 1, a hydrogen customer client 5 associated with the fuel cell vehicle 18 may facilitate communication with a central computer system 7 in association with the direct fueling. Thus, person associated with the fuel cell vehicle, e.g. an owner, may receive part of a lifecycle data package from the central computer system 7 relating to the hydrogen being fueled to the fuel cell vehicle 18. This person may for example receive information relating to a power generator 11*a*-11*c* providing power used in production of the hydrogen, or receive information relating to the hydrogen production facility 3 where the hydrogen was produced. In some embodiments, the central computer system receives information relating to the direct fueling of the fuel cell vehicle 18 via the hydrogen customer client, for example a time stamp, information relating to an amount of fueled hydrogen, or a geographic location of the fueling. In some embodiments, part of this information is alternatively provided to the central computer system 7 via the hydrogen logistics client 4, as opposed to via the hydrogen customer client 5.

In some embodiments of the invention, a hydrogen refueling station 17 may receive at least a part H2-*x* of a batch of hydrogen, for example from a hydrogen tube trailer 14 or a hydrogen piping system 16, and the hydrogen refueling station 17 may facilitate fueling of fuel cell vehicles 18, wherein both the hydrogen refueling station 17 and the fuel cell vehicles 18 are associated with hydrogen customer clients 5. Any of these hydrogen customer clients may communicate with the central computer system 7. The information provided to the central computer system 7 may be information relating to the fueling, e.g. time stamp, amount of fueled hydrogen, and location. The information provided through the hydrogen customer clients 5 to the owner may be part of the lifecycle data package and may for example comprise information relating to power generation 27, hydrogen production 20, and/or carbon footprint of the fueled hydrogen, e.g. power generator or type of power generator supplying power for the production of hydrogen.

By receiving information from customer clients 5, more particular from the fuel cell vehicle and/or from the driver of the fuel cell vehicle, the central computer system 7 is able to optimize production planning, perform forecasts, advice on how much a fuel cell vehicle should be fueled if not fueled up to 100% state of charge, etc. An example hereof is provided in the following sections.

A bus company is contractual obligate to use green hydrogen on several bus route. There has been no wind and no sun for a period of time, so from the production client 2 and/or the power supply client 10, the central computer system knowns that the amount of green hydrogen on stock is limited. From the environment client 12, the central computer system knows that in two days the weather forecast promise wind. From logistics clients 4, the central computer system 7 knows that two tube trailers 14 are at the production facility in two days when green hydrogen again can be produced, however for the bus company to receive enough green hydrogen a third tube trailer is needed. Therefore, via a logistics client the central computer system contacts the driver or manager of the tube trailer fleet and requests a third tube trailer at the production facility in two days.

In the meantime, the central computer system communicates to one of the hydrogen refueling stations fueling busses of the bus company, via the associated receiving entity client 29, an amount of the remaining hydrogen to be fueled to the individual busses. The amount is just enough for the busses to drive their daily route. The central computer system has knowledge of the needed amount based on information received from the customer client 5 associated with the particular bus and preferably also the driver of that bus on that route. The received information includes information from the past of consumption of that particular bus drived by the particular driver (driving pattern has effect on consumption per drived km) on that particular route.

Unfortunately, the hydrogen refueling station is out of order. The central computer system is informed about this by the receiving entity client associated with that fueling station. The central computer system knows that a neighbor fueling station has green hydrogen on storage, from information received from a logistic client of a tube trailer associated with that fueling station. Accordingly, the central computer system directs the bus to the neighbor station via information of the out of order station and recommendation of the neighbor station and maybe route thereto. This information is communicated to the driver of the bus via a customer client associated with that particular bus.

Another example is that price may be different on green and black hydrogen. Hence a costumer may setup his customer client to provide information of when which type of energy is cheapest. In the same way, the production facility client can produce hydrogen when power is cheapest. This information may be provided from the central computer system to the associated clients and the central computer system may have knowledge of the pricing of electricity from the power supply client. The power supply client in this example is able to retrieve information pricing information of energy on the utility grid.

It should be mentioned, that the central computer based on input received from one or more of the clients can be used as buffer storage planning. Buffer storage should be understood as including one or more of the buffer storage of the production facility, the gas vessels of the trailer/piping system of the logistics, on-site storage at the hydrogen refueling station and even vehicle tanks of fuel cell vehicles. Via communication with the clients, the central computer may determine if production of hydrogen should be increased or reduced. If e.g. the production should be increased e.g. due to low energy price on green energy, then the central computer may plan to have as many empty trailers as possible available. This can e.g. include dumping off and refueling as much as possible at the refueling stations.

It should be mentioned that by the information receive from e.g. tube trailers (via logistics clients), fuel cell vehicles (via customer clients) and hydrogen refueling stations (via receiving entity clients) the central computer may determine how much available power storage capacity that exists in the chain from production to consumption. In addition, with information related to energy production and energy pricing (via power supply client) and weather information (via the environment client) the central computer is able to plan and cost optimize production and distribution of hydrogen in the chain.

It should be noted, that the central computer may receive information from the connected clients, process the information and use the result of the processing internally for optimizing of production and logistics without providing the information to any clients. Hence the received information may either be shared with a customer and/or be used internally by the central computer.

It should be noted that e.g. the power supply client or other clients may be third party clients i.e. handled outside the supervisory system. As an example, all information related to power supply may be handled by a party and according to a method which is external to the supervisory system. The central computer system is only provided with predefined information.

In addition to the above, information relevant for the central computer system received from the production facility client includes, but is not limited, to sensor data, data logs, warnings, trends of process parameters (such as pressure and temperature), alarms, status on production, information of defects and malfunctions, produced amounts of hydrogen, efficiency of production facility or parts thereof, etc. Part if this information can be used to central product planning e.g. based on contractual obligations on purchase of energy from the utility grid. Hence if the supervisory system includes four production facilities, then the energy consumption of these four facilities can be coordinated to comply with requirements of the contract on energy purchase. This coordination is made by the central computer system. Further, if energy price fluctuations suddenly benefit an increased or reduced production, this can also determined and initiated centrally from the central computer system. Further, routing of trailers or fuel cell vehicles in case of malfunction of fueling stations may also be coordinated from the central computer system based on input from the clients of the system.

In addition to the above, information relevant for the central computer system received from the logistics clients include, but is not limited to, global position data (from GPS system), temperature, pressure, volume, surveillance/status on valves of the tube trailer, status of leakage detection systems. A digital twin of the tube trailer established on the central computer system may be used to monitor/predict cycle counts, service intervals, pressure of wheels of the trailer, etc.

In addition to the above, information relevant for the central computer system received from the customer clients include, but is not limited to, fuel cell vehicle type, user ID, vehicle ID, vehicle computer information (similar to the information provided to the driver of the fuel cell vehicle), general feedback from the user of the customer client app installed on the users smartphone, etc.

In addition to the above, information relevant for the central computer system received from the receiving entity clients include, but is not limited to, pressure, temperature, oil temperature, process parameters, pressure levels in storage vessels, errors, billing information, fueling profiles, etc.

Note that embodiments according to the invention may comprise any elements and combination of elements presented in the description of the figures. Generally, a supervisory system according to the invention may uses the central computer system 7 to communicate any information which is relevant for power generation 27 for producing of hydrogen, hydrogen production 20, hydrogen distribution 21 and/or entities receiving hydrogen 22 and facilitate this communication via clients 2,4,5,10,12, 29, 30.

Note that when it is stated above, that the information from one client can be used to calculate, predict, etc. it should be noted that the more clients of a particular type, particular customer clients, information is received from, the better calculations and predictions the central computer system can perform.

From the above, it is now clear that the invention relates to a hydrogen supervisory control and data acquisition system for monitoring batches of hydrogen, produced at one or more facilities. Relevant information relating to the electrical power used in production, production, and distribution may be communicated via clients to a central computer system, which is then able to establish a lifecycle data package for the hydrogen. Part of this lifecycle data package may then be provided through a customer client to a customer receiving some of the hydrogen. The system enables customers to receive relevant information relating to hydrogen they are purchasing, for example receive information relating to the carbon footprint of the hydrogen. The system further enables managing of hydrogen production and distribution. A hydrogen production plan may for example be established based on one or more lifecycle data packages, e.g. based on distribution of hydrogen, predicted hydrogen demand, and predicted generation of renewable energy.

The system of the present invention is advantages in that based on the information gathered, it is possible from the central computer to reduce costs of one unit or batch of hydrogen. Several ways of doing this is described above, and in addition to that, it is possible to plan production of hydrogen including not utilizing full capacity of a production facility. Thereby, it is possible to reserve a power consumption to when the grid operator needs this usage i.e. to regulate price or stabilize the grid. This is only possible because knowledge of amount of hydrogen present in the chain including one or more storages at vehicle, trailers, hydrogen in pips, etc. is known. Thereby it is possible op optimize cost of a hydrogen batch by planning production based on the information received by the central computer system.

In addition, thereto the invention is advantageous in that security of supply is increased in that knowledge of the volume of hydrogen present in the at least part of the chain illustrated in the figures from production to consumption is known. Hence, the number and type of simultaneous errors that would be critical to security of supply can be determined. Based thereon, the mitigation of such errors and a plan to follow in case of different errors can be established and thereby increase the likelihood and hydrogen can always be supplied to the consumer.

LIST OF REFERENCE SIGNS

1. Hydrogen supervisory control and data acquisition system (referred to simply as supervisory system)
2. Hydrogen production facility client
3. Hydrogen production facility (electrolysis)
4. Hydrogen logistics client
5. Hydrogen customer client
6. Entity receiving hydrogen
7. Central computer system
8. Data processor
9. Data storage
10. Power supply client
11. Power generator
12. Environment client
13. Meteorological database
14. Hydrogen tube trailer
15. Hydrogen flow meter
16. Hydrogen piping system
17. Hydrogen refueling station
18. Fuel cell vehicle
19. Industrial plant using hydrogen in production
20. Hydrogen production
21. Hydrogen distribution
22. Entities receiving hydrogen
23. Hydrogen byproduct facility
24. Customer
25. Industrial output produced using hydrogen
26. Industrial product produced using hydrogen
27. Power generation
28. Meteorology
29. Receiving entity client
H2-1, H2-2, H2-$n$ batch of hydrogen
H2-$x$ part of batch of produced hydrogen
H2-$y$ second part of batch of produced hydrogen
H2-$xx$ subset of part of batch of produced hydrogen

The invention claimed is:
1. A hydrogen supervisory control and data acquisition system for monitoring a plurality of batches of hydrogen, the hydrogen supervisory control and data acquisition system comprising:
a hydrogen production facility client, associated with a hydrogen production facility and configured for acquiring information related to the production of the plurality of batches of hydrogen at the hydrogen production facility, and
a central computer system comprising a data processor and a data storage, the central computer system is configured for communicating with the hydrogen production facility client,
wherein the central computer system, during a production of hydrogen, records
a time of a production period during which the hydrogen production facility is powered from a renewable power source,
a time of a production period during which the hydrogen production facility is powered from a fossil power source, hydrogen produced during the production period during which the hydrogen production facility is powered from the renewable power source, and
hydrogen produced during the production period during which the hydrogen production facility is powered from the fossil power source,
wherein the central computer system, at the end of the production periods defines
the hydrogen produced during the production period with renewal power source as green hydrogen, and
the hydrogen produced during the production period with fossil power source as black hydrogen,
wherein the central computer system is configured to, based on information received from the hydrogen production facility client, establish a lifecycle data package of at least a part of the plurality of batches of hydrogen,
wherein the lifecycle data package includes information associated with the production of the part of the plurality of batches of hydrogen,
wherein the information in the lifecycle data package includes whether the hydrogen within a batch is defined as green hydrogen or black hydrogen.
2. The hydrogen supervisory control and data acquisition system according to claim 1, wherein the system furthermore comprising a hydrogen customer client, associated with an entity receiving at least a subset of the part of the plurality of batches of hydrogen, and wherein the central computer system is configured to communicate at least part of the lifecycle data package, to said hydrogen customer client.
3. The hydrogen supervisory control and data acquisition system according to claim 1, wherein the hydrogen supervisory control and data acquisition system further comprising a hydrogen logistics client, associated with distribution of at least a part of the plurality of batches of hydrogen,
wherein the central computer system is configured to communicate with the hydrogen logistics client, and
wherein the central computer system is configured to include information associated with the distribution of the part of the plurality of batches of hydrogen in the lifecycle data package.
4. The hydrogen supervisory control and data acquisition system according to claim 1, wherein a hydrogen logistics client is communicating with a GPS on a hydrogen tube trailer and thereby configured for providing global position data of the hydrogen tube trailer to the central computer system.
5. The hydrogen supervisory control and data acquisition system according to claim 1, wherein a hydrogen tube trailer is a MEGC trailer with a control and monitoring unit configured for controlling valves of a conduit system and thereby gas flow from gas sections to outlets of the MEGC trailer.
6. The hydrogen supervisory control and data acquisition system according to claim 1, wherein the hydrogen supervisory control and data acquisition system further comprises a receiving entity client associated with a hydrogen refueling station and configured for acquiring information related to the fueling of a tank of a fuel cell vehicle.
7. The hydrogen supervisory control and data acquisition system according to claim 1, wherein the hydrogen supervisory control and data acquisition system further comprises a power supply client associated with a power generator configured to generate and/or deliver power to the hydrogen production facility.
8. The hydrogen supervisory control and data acquisition system according to claim 1, wherein a power supply client is configured for providing information of at least one of the list comprising: type of power generator, geographic location of the power generator, owner of power generator and cost of produced energy in a specified period of time.

9. The hydrogen supervisory control and data acquisition system according to claim 1, wherein the central computer system is configured to establish a hydrogen production plan based on information received from an environment client and from the hydrogen customer client or from a receiving entity client.

10. The hydrogen supervisory control and data acquisition system according to claim 1, wherein the central computer system furthermore comprises at least one of the list comprising: Enterprise Resource Planning system, Customer Relation Management system and database.

11. The hydrogen supervisory control and data acquisition system according to claim 1, wherein the hydrogen supervisory control and data acquisition system is, by means of one or more clients, configured for monitoring part of the plurality of hydrogen batches during a period of time starting from when the part of the plurality of batches of hydrogen is produced to when it is used.

12. The hydrogen supervisory control and data acquisition system according to claim 1, wherein the central computer system is configured for determining a destination for a hydrogen tube trailer comprising part of a batch of hydrogen based on information received from the power supply client.

13. The hydrogen supervisory control and data acquisition system according to claim 1, wherein hydrogen supervisory control and data acquisition system is configured to include hydrogen batch metadata in the lifecycle data package.

14. The hydrogen supervisory control and data acquisition system according to claim 1, wherein said hydrogen supervisory control and data acquisition system is configured to establish environmental footprint data and to include information of this environmental footprint related to production of a batch of hydrogen and transportation of the batch of hydrogen in the lifecycle data package.

15. The hydrogen supervisory control and data acquisition system according to claim 1, wherein a batch of hydrogen is defined by an amount of energy used by the hydrogen production facility to produce hydrogen.

16. The hydrogen supervisory control and data acquisition system according to claim 1, wherein the supervisory control and data acquisition system comprise at least one standalone client facilitating two-way communication between the at least one standalone client and the central computer system and at least one customer client embedded in a smartphone.

17. The hydrogen supervisory control and data acquisition system according to claim 1, wherein the central computer is configured to receive storage capacity information from at least one of the list comprising: one production facility client, one hydrogen customer client and one logistics client.

18. A method of monitoring a batch of hydrogen from production at a hydrogen production facility to storage at a receiving entity and ready to be consumed, the method comprising the steps of:

establish data communication between a hydrogen production facility client and a central computer system, and between a hydrogen customer client and the central computer system, receive, by the central computer system, from the hydrogen production facility client, information related to the production of the batch of hydrogen, wherein the information related to the production of the batch of hydrogen includes a time of a production period during which the hydrogen production facility is powered from a renewable power source, a time of a production period during which the hydrogen production facility is powered from a fossil power source, hydrogen produced during the production period during which the hydrogen production facility is powered from the renewable power source, and hydrogen produced during the production period during which the hydrogen production facility is powered from the fossil power source, wherein the central computer system, at the end of the production periods defines the hydrogen produced during the production period with the renewal power source as green hydrogen, and the hydrogen produced during the production period with alternative power source as black hydrogen, the central computer system establishing a lifecycle data package of the batch of hydrogen based on the information received from the hydrogen production facility client and the hydrogen customer client, and providing to the hydrogen customer client, at least part of the lifecycle data package from the central computer system wherein the lifecycle data package includes information of whether the hydrogen within a batch is defined as green hydrogen or black hydrogen.

19. The method according to claim 18, wherein the method further comprises the steps of establish data communication between a logistic client and the central computer system, receive, by the central computer system, from the logistic client information related to distribution of the batch of hydrogen, and update the lifecycle data package based on information received from the logistics client.

20. The method according to claim 18, wherein the lifecycle data package includes information to the customer selected from the list comprising: special hydrogen offerings, operational status of selected hydrogen refueling stations, hydrogen price, type of hydrogen, hydrogen batch metadata, environmental footprint related to production of a batch of hydrogen and related to transportation of the batch of hydrogen, or information associated with the power source of the hydrogen production, information associated with the facility at which the hydrogen is produced.

* * * * *